United States Patent [19]
Rabenbauer

[11] 4,064,835
[45] Dec. 27, 1977

[54] AIR CONDITIONED PET BED

[76] Inventor: Ludwig Rabenbauer, 1495 Grandville Ave., Pontiac, Mich. 48055

[21] Appl. No.: 730,227

[22] Filed: Oct. 6, 1976

[51] Int. Cl.² .................................................. A01K 29/00
[52] U.S. Cl. ............................................ 119/1; 62/457
[58] Field of Search ................ 119/22, 1, 19; 62/457, 62/458, 464, 459

[56] References Cited
U.S. PATENT DOCUMENTS 2,661,718  12/1953  Ruport .................................. 119/22
2,959,938  11/1960  Giardini .................................. 62/457

*Primary Examiner*—Louis G. Mancene
*Assistant Examiner*—Peter K. Skiff

[57] ABSTRACT

An air-conditioned pet bed wherein a portable unit is provided with an insulated bottom portion containing re-usable, pre-frozen, chemical ice-packs and a top portion which fits over the bottom portion and has a planar, perforated surface to provide an area for a pet to recline and prevent direct contact with the ice-packs, thereby providing cooling of the pet through the perforations in the top portion.

1 Claim, 5 Drawing Figures

U.S. Patent    Dec. 27, 1977    4,064,835
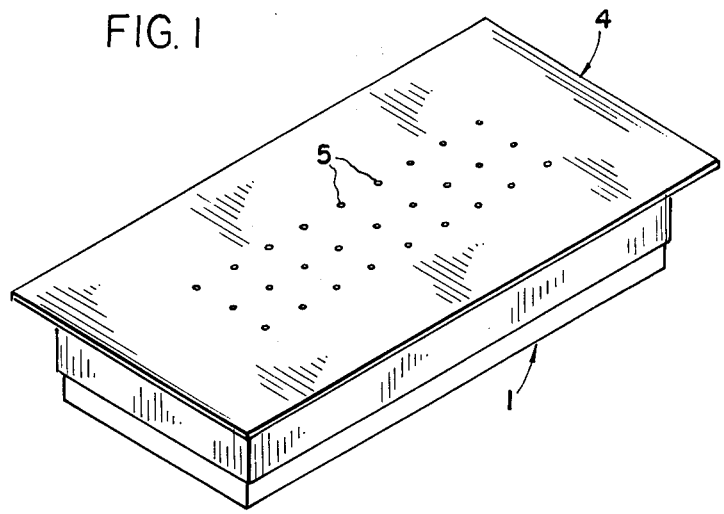
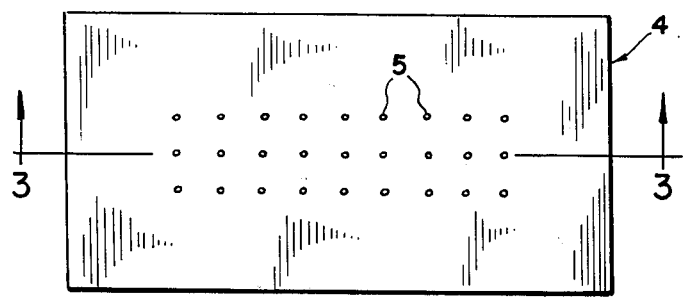
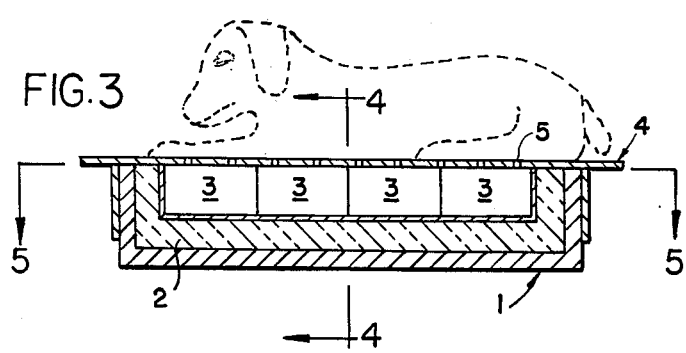
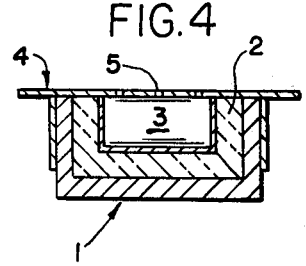
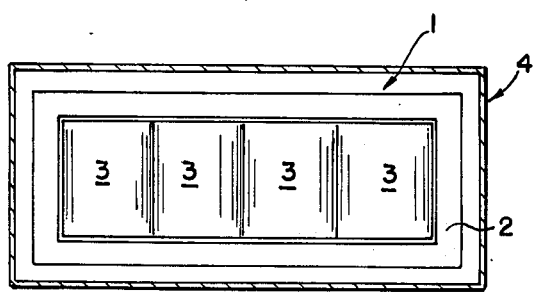

AIR CONDITIONED PET BED

SUMMARY OF THE INVENTION

Pet beds at present provide only a warm atmosphere, whereas, it is the object of this invention to provide a device useful in the hot summer months for cooling a pet as it reclines on the surface of the device. It is a further object to provide a portable device having a re-usable, pre-frozen source of cooling removably contained within the device.

These and other advantages of the invention may be seen in the details of operation and construction set down in the ensuing specification.

BRIEF DESCRIPTION OF THE DRAWINGS

FIG. 1 is a perspective view of the apparatus of the invention.

FIG. 2 is a top view of the device as seen from above.

FIG. 3 is a sectional view of the device as seen along line 3—3 of FIG. 2.

FIG. 4, is a sectional view of the device as seen from one end.

FIG. 5 is a sectional view of the device as seen along line 5—5 of FIG. 3.

DETAILED DESCRIPTION OF THE DRAWINGS

The invention includes a lower portion 1 and an upper portion 4 as shown in FIG. 1. The lower portion 1 is made of material such as wood or plastic, and is of sufficient strength to support the weight of a pet, as shown in dotted lines in FIG. 3. The interior side walls, end walls and bottom wall of lower portion 1 form a container and are lined with insulation material 2 to prevent external heat from entering through these surfaces. Re-usable, pre-frozen, artificial, ice-packs 3 are placed in this container and are the source of cooling of this device. The top portion 4 has a planar surface with perforations 5 therein and downwardly extending flanges which fit around end walls and side walls of bottom portion 1. The perforated planar surface provides an area on which the pet reclines and simultaneously prevents direct contact with the aforementioned ice-packs. The body heat from the pet passes to the ice packs through the perforations 5 in the upper portion 4.

While in the foregoing specification a detailed description has been set down for the purpose of explanation, many variations in the details herein given may be made by those skilled in the art without departing from the spirit and scope of the invention.

I claim:
1. An air conditioned pet bed comprising,
   a lower portion having sidewalls, end walls and a bottom wall,
   an upper portion having a planar perforated top surface and downwardly extending flanges sized to fit closely around said sidewalls and end walls of said lower portion, insulation material lining the interior surfaces of said sidewalls, said endwalls and said bottom wall of said lower portion,
   cooling means in the form of re-usable, pre-frozen, chemical ice-packs adapted to fit within said insulated lower portion when covered by said upper portion to provide cooling through said perforations to a pet reclining on said upper surface of said upper portion.

* * * * *